US 6,735,639 B2

(12) United States Patent
Higuchi

(10) Patent No.: US 6,735,639 B2
(45) Date of Patent: May 11, 2004

(54) DIRECT MEMORY ACCESS TRANSFER CONTROL CIRCUIT

(75) Inventor: Ryohei Higuchi, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 122 days.

(21) Appl. No.: 10/138,297

(22) Filed: May 6, 2002

(65) Prior Publication Data

US 2003/0088718 A1 May 8, 2003

(30) Foreign Application Priority Data

Nov. 6, 2001 (JP) .......................................... 2001-341010

(51) Int. Cl.[7] .......................... G06F 13/14; G06F 13/28
(52) U.S. Cl. ................ 710/6; 710/22; 710/33; 710/34; 710/35; 710/39; 710/40
(58) Field of Search .............................. 710/22, 33, 34, 710/35, 39, 40, 6

(56) References Cited

U.S. PATENT DOCUMENTS

| | | | | |
|---|---|---|---|---|
| 4,716,523 A | * | 12/1987 | Burrus et al. ................. | 710/28 |
| 5,392,450 A | * | 2/1995 | Nossen ...................... | 455/12.1 |
| 6,240,458 B1 | * | 5/2001 | Gilbertson .................. | 709/232 |
| 6,298,397 B1 | * | 10/2001 | Maruyama ................... | 710/25 |
| 6,336,179 B1 | * | 1/2002 | Gulick ........................ | 712/32 |
| 6,496,866 B2 | * | 12/2002 | Attanasio et al. ........... | 709/239 |
| 6,571,302 B1 | * | 5/2003 | DeWilde et al. .............. | 710/35 |

FOREIGN PATENT DOCUMENTS

JP          8-161255          6/1996

* cited by examiner

Primary Examiner—Rehana Perveen
(74) Attorney, Agent, or Firm—Leydig, Voit & Mayer, Ltd.

(57) ABSTRACT

DMA transfer request signals corresponding to respective channels are received and held in respective transfer request holding circuits. DMA transfers are assigned to the DMA transfer request signals respectively in a channel transfer request arbitrating circuit according to priorities set in advance for the DMA transfer request signals, and the DMA transfers for the DMA transfer request signals are performed in the order of lower priority. Also, a transfer waiting time period from the reception of one DMA transfer request signal to the assignment of the DMA transfer is measured in a transfer waiting time counter for each DMA transfer request signal, and the transfer waiting times are, for example, stored in a storing circuit and are selectively read out.

13 Claims, 9 Drawing Sheets

DIRECT MEMORY ACCESS TRANSFER CONTROL CIRCUIT

BACKGROUND OF THE INVENTION

1. Field of the Invention

The present invention relates to a direct memory access (DMA) transfer control circuit used for an information processing system.

2. Description of Related Art

FIG. 9 is a block diagram showing a conventional direct memory access transfer control circuit (DMAC). In FIG. 9, 1 indicates a conventional direct memory access (DMA) transfer control circuit. $10_1$, $10_2$, - - - and $10_N$ (N is an integer equal to or higher than 2) indicate a plurality of channel control units respectively. The number N denotes the number of channels. 2 indicates a DMA transfer control unit. In the channel control units $10_1$ to $10_N$, a plurality of transfer request holding circuits $20_1$, $20_2$, - - - and $20_N$ are disposed respectively. In the DMA transfer control unit 2, a channel transfer request arbitrating circuit 3 is disposed. A plurality of DMA transfer request signals DRQ1 to DRQN corresponding to the channels respectively are sent from modules (not shown) other than the conventional DMA transfer control circuit 1 to the transfer request holding circuits $20_1$, $20_2$, - - - and $20_N$ of the conventional DMA transfer control circuit 1 respectively.

Next, an operation of the conventional DMA transfer control circuit 1 will be described below.

When a DMA transfer request signal DRQn (n is an arbitrary integral number ranging from 1 to N) is input to the channel control unit $10_n$ of the conventional DMA transfer control circuit 1, the DMA transfer request signal DRQn is once held in the transfer request holding circuit $20_n$ of the channel control unit $10_n$. Thereafter, the DMA transfer request signal DRQn held in the transfer request holding circuit $20_n$ is fed to the DMA transfer control unit 2 as a channel transfer request.

Therefore, a plurality of DMA transfer request signals DRQ1 to DRQN sent from the other modules are received in the DMA transfer control unit 2 as a plurality of channel transfer requests respectively. In cases where a plurality of channel transfer requests are received in the DMA transfer control unit 2, the arbitration among the channel transfer requests is performed in the channel transfer request arbitrating circuit 3 of the DMA transfer control unit 2, and one channel transfer request is selected to determine the performance of a DMA transfer for the selected channel transfer request. In detail, priorities are set in advance for the channel transfer requests (or the channel transfer request signals). When a plurality of channel transfer requests are received in the DMA transfer control unit 2, a DMA transfer is assigned to one channel transfer request (hereinafter, called a top priority channel transfer request) having the top priority among those of the channel transfer requests. Thereafter, the DMA transfer is first performed for the top priority channel transfer request in a prescribed procedure. When the DMA transfer for the top priority channel transfer request is completed, a DMA transfer for the second priority channel transfer request is performed. Thereafter, the DMA transfers for the other channel transfer request signals are performed one after another in the order of lowering the priority of the channel transfer request.

Because the conventional DMA transfer control circuit has the above-described configuration, it is impossible to grasp how long the performance of the DMA transfer for each channel transfer request having the priority lower than that of the top priority channel transfer request is delayed. In other words, a transfer waiting time period of the DMA transfer performed in response to each remarked channel transfer request signal depends on the number of received channel transfer request signals having priorities higher than that of the remarked channel transfer request signal, and it is impossible to grasp the transfer waiting time period of the DMA transfer in the module corresponding to the remarked channel transfer request signal.

Therefore, in cases where the priority set in advance for the remarked channel transfer request signal is low, it takes a long time to perform the DMA transfer in response to the remarked channel transfer request signal. Therefore, a problem has arisen that it is difficult to set optimum priorities for a plurality of channel transfer request signals of the other modules. Also, in cases where the transfer waiting time period for the DMA transfer is prolonged, there is probability that a system error occurs. Because it is impossible to grasp the transfer waiting time period, another problem has arisen that it is impossible to prevent the occurrence of a system error in advance.

SUMMARY OF THE INVENTION

An object of the present invention is to provide, with due consideration to the drawbacks of the conventional DMA transfer control circuit, a DMA transfer control circuit in which a transfer waiting time period for a DMA transfer is shortened to efficiently perform the DMA transfer.

The object is achieved by the provision of a direct memory access transfer control circuit, comprising transfer control means for receiving N (N denotes an integral number equal to or higher than 2) DMA transfer requests composed of the first to N-th DMA transfer requests, assigning a plurality of DMA transfers to the N DMA transfer requests respectively according to priorities set in advance for the N DMA transfer requests and controlling the DMA transfers, and measuring means for measuring a time period from the reception of each DMA transfer request performed by the transfer control means to the assignment of the DMA transfer to the DMA transfer request performed by the transfer control means and outputting the time periods as a plurality of transfer waiting time periods of the N DMA transfer requests.

In the above configuration, in cases where a plurality of DMA transfers corresponding to a plurality of channels are performed, a transfer waiting time period from the reception of the DMA transfer request to the assignment of the DMA transfer can be grasped for each channel. Also, because the transfer waiting time period from the reception of the DMA transfer request to the assignment of the DMA transfer is grasped for each channel, the priority set for each DMA transfer request can be appropriately changed by comparing the transfer waiting time period of the DMA transfer request and a time before a system error occurs. Accordingly, the system error can be prevented.

It is preferred that the transfer waiting time period of each DMA transfer request is measured by the measuring means each time the DMA transfer request is received, and the transfer waiting time period longest among the time periods of one DMA transfer request is held by the measuring means as a maximum transfer waiting time period for each DMA transfer request.

Therefore, an operator can recognize the maximum transfer waiting time period for each DMA transfer request.

It is preferred that the transfer control means comprises a plurality of transfer request holding circuits for receiving the N DMA transfer requests respectively, holding the N DMA transfer requests respectively, and the measuring means comprises a plurality of counters for measuring a plurality of time periods from the holding of the DMA transfer requests in the transfer request holding circuits to the assignment of the DMA transfers to the DMA transfer requests in a count operation as the transfer waiting time periods of the N DMA transfer requests.

Therefore, the transfer waiting time period can be reliably measured for each DMA transfer request.

It is preferred that the direct memory access transfer control circuit further comprises a storing circuit for storing the transfer waiting time periods of the N DMA transfer requests, and reading means for selecting one of the transfer waiting time periods and reading out the selected transfer waiting time period.

Therefore, because the transfer waiting time period is stored in the storing means for each DMA transfer request, the order of the DMA transfers performed in response to the DMA transfer requests can be grasped. Also, in cases where a control method adopted in an information processing system and the priorities set in advance for the DMA transfer requests are reconsidered according to the transfer waiting time periods stored in the storing means, the DMA transfers for the DMA transfer requests can be efficiently performed.

It is preferred that the direct memory access transfer control circuit further comprises count control means for selecting one of the counters and feeding a count enabling signal to the selected counter so as to set the selected counter in a count enabling condition.

Therefore, because the measurement of the transfer waiting time period can be set for each counter, a degree of congestion of the DMA transfers can be minutely grasped.

It is preferred that the direct memory access transfer control circuit further comprises count control means for feeding a plurality of count enabling signals to all the counters respectively in response to an event signal input from an outside so as to set the counters in a count enabling condition.

Therefore, the measurement of the transfer waiting time period can be simultaneously set for all the counters.

It is preferred that the transfer control means comprises assigning means for assigning the DMA transfers to the N DMA transfer requests respectively according to the priorities set in advance for the N DMA transfer requests, receiving an emergency transfer request signal from a transfer request factor from which the n-th (n is an integral number ranging from 1 to N) DMA transfer request included among the N DMA transfer requests is sent out, and assigning the DMA transfer to the n-th DMA transfer request.

Therefore, there is no probability that no DMA transfer for the DMA transfer request is performed for a long time after the sending-out of the DMA transfer request, and the DMA transfer control circuit can prevent the occurrence of a system error.

It is preferred that the reception of the emergency transfer request signal is performed by the assigning means when a prescribed time period passes after the reception of the n-th DMA transfer request.

Therefore, the DMA transfer for the DMA transfer request can be reliably performed within a prescribed time period.

It is preferred that the direct memory access transfer control circuit further comprises comparing means for comparing the transfer waiting time periods output by the measuring means with a plurality of comparing values set in advance respectively, and outputting a comparison result agreement signal in cases where the n-th (n is an integral number ranging from 1 to N) transfer waiting time period included in the transfer waiting time periods agrees with the corresponding comparing value, and interrupting means for admitting the interruption of the n-th DMA transfer request included in the N DMA transfer requests in response to the comparison result agreement signal.

In the above configuration, when the n-th transfer waiting time period agrees with the corresponding comparing value, the interruption of the n-th DMA transfer request is admitted to assign the DMA transfer to the n-th DMA transfer request. Therefore, there is no probability that no DMA transfer is performed for the DMA transfer request set to a lower priority in advance.

The object is also achieved by the provision of a direct memory access transfer control circuit, in which N (N denotes an integral number equal to or higher than 2) DMA transfer requests composed of the first to N-th DMA transfer requests are received, a plurality of DMA transfers are assigned to the N DMA transfer requests respectively according to priorities set in advance for the N DMA transfer requests and the DMA transfers are controlled, comprising counting means for counting the number of DMA transfers for each DMA transfer request and obtaining a plurality of count values corresponding to the N DMA transfer requests, comparing means for comparing the count values obtained by the counting means with a plurality of comparing values set in advance respectively, and outputting a comparison result agreement signal in a case where the n-th (n is an integral number ranging from 1 to N) count value corresponding to the n-th DMA transfer request agrees with the corresponding comparing value, and priority changing means for changing the priorities set in advance for the N DMA transfer requests in response to the comparison result agreement signal output by the comparing means.

In the above configuration, in cases where the n-th count value agrees with the corresponding comparing value, the priorities set in advance for the DMA transfer requests are changed. Therefore, there is no probability that no DMA transfer is performed for the DMA transfer request signal set to a lower priority in advance.

It is preferred that the lowest priority is set for the n-th DMA transfer request corresponding to the n-th count value by the priority changing means in response to the comparison result agreement signal corresponding to the n-th count value.

Therefore, the comparing values are set in advance according to the priorities set in advance for the DMA transfer requests, and the lowest priority is set for the DMA transfer request in cases where the n-th count value agrees with the corresponding comparing value. Accordingly, the DMA transfers for the DMA transfer requests can be performed in a prescribed ratio among the number of DMA transfers for a plurality of first DMA transfer requests, the number of DMA transfers for a plurality of second DMA transfer requests, - - - and the number of DMA transfers for a plurality of N-th DMA transfer requests, and there is no probability that no DMA transfer is performed for the DMA transfer request set to a lower priority in advance.

It is preferred that the comparing values set in advance by the comparing means are determined according to the priorities set in advance for the N DMA transfer requests.

Therefore, the transfer waiting time period for each DMA transfer request can be shortened, and the DMA transfers for the DMA transfer requests can be efficiently performed.

It is preferred that the count value obtained by the counting means and corresponding to the n-th DMA transfer request is initialized by the priority changing means in response to the comparison result agreement signal.

Therefore, the priorities set for the N DMA transfer requests can be appropriately changed each time one count value agrees with the corresponding comparing value.

DETAILED DESCRIPTION OF THE PREFERRED EMBODIMENTS

Embodiments of the present invention will now be described with reference to the accompanying drawings.

Embodiment 1

Figure 1:
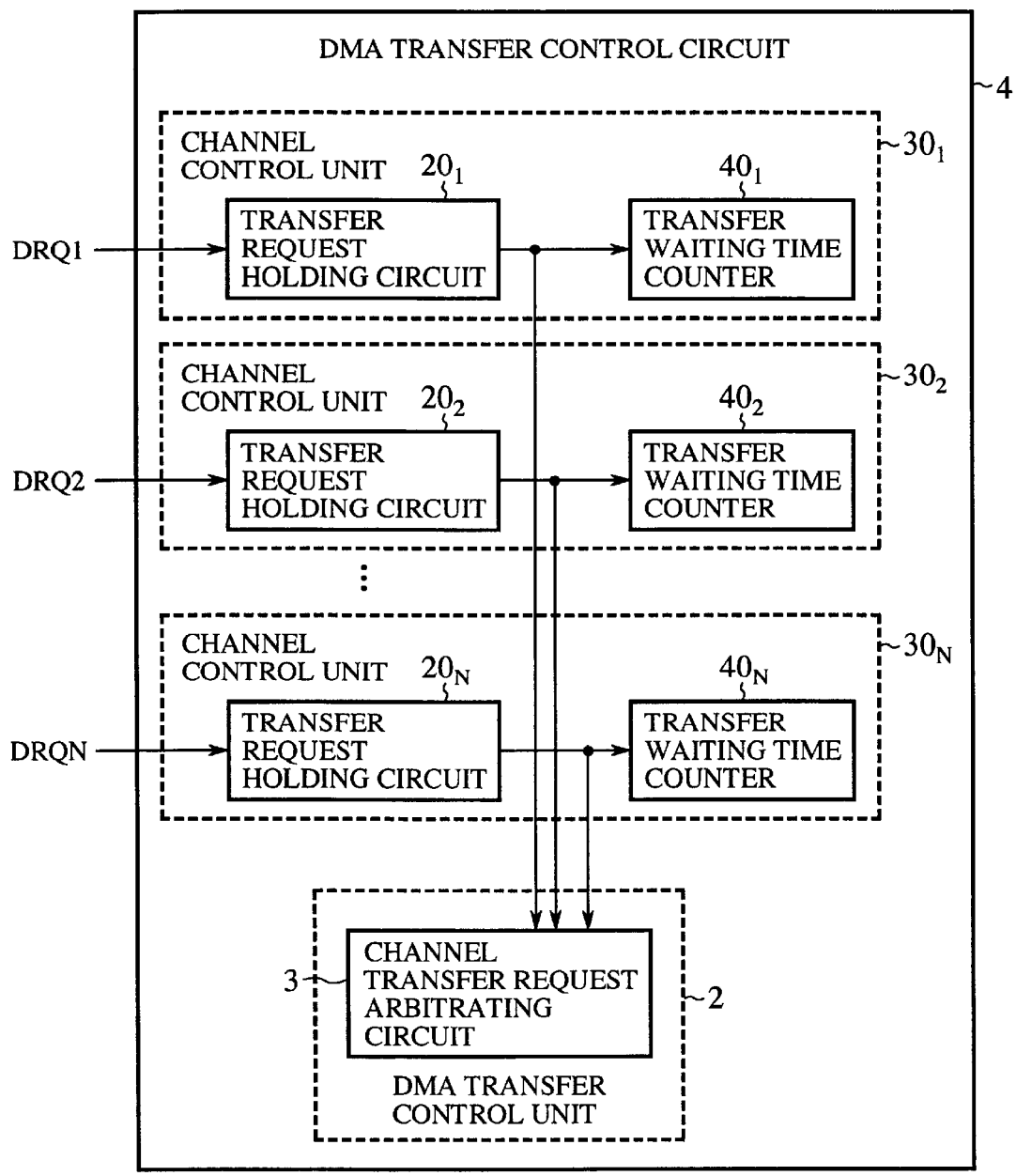
FIG. 1 is a block diagram showing a direct memory access transfer control circuit according to a first embodiment of the present invention.
Figure 9:
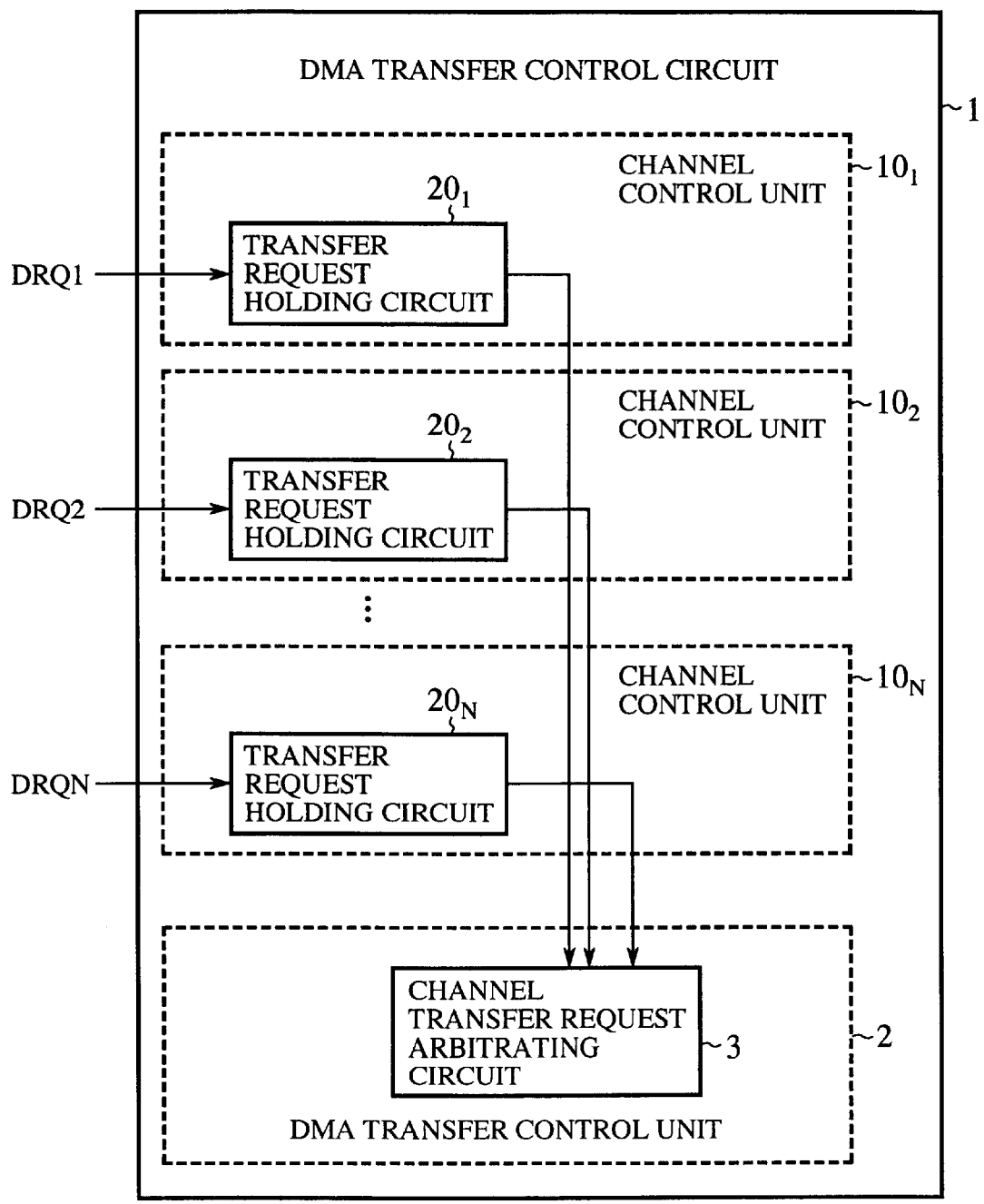
FIG. 9 is a block diagram showing a conventional direct memory access transfer control circuit.

FIG. 1 is a block diagram showing a direct memory access transfer control circuit according to a first embodiment of the present invention. The constituent elements, which are the same as those shown in FIG. 9, are indicated by the same reference numerals as those of the constituent elements shown in FIG. 9.

In FIG. 1, 4 indicates a direct memory access (DMA) transfer control circuit. $30_1, 30_2, \text{---}$ and $30_N$ (N denotes an integral number equal to or higher than 2) indicate a plurality of channel control units respectively. The channel control units $30_1$ to $30_N$ correspond to a plurality of channels respectively. In the channel control units $30_1$ to $30_N$, the transfer request holding circuits $20_1$ to $20_N$ (or transfer control means) and a plurality of transfer waiting time counters (or measuring means for measuring a time period) $40_1, 40_2, \text{---}$ and $40_N$ are disposed respectively. A plurality of DMA transfer request signals DRQ1 to DRQN corresponding to the channels are sent from modules (not shown) other than the DMA transfer control circuit 4 to the channel control units $30_1$ to $30_N$ of the DMA transfer control circuit 4 respectively.

Next, an operation of the DMA transfer control circuit 4 will be described below.

When a DMA transfer request signal DRQn (n is an arbitrary integral number ranging from 1 to N) is input to the channel control unit $30_n$ of the DMA transfer control circuit 4, the DMA transfer request signal DRQn is once held in the transfer request holding circuit $20_n$ of the channel control unit $30_n$. Thereafter, the DMA transfer request signal DRQn held in the transfer request holding circuit $20_n$ is fed to the DMA transfer control unit (or transfer control means) 2 as a channel transfer request.

Therefore, a plurality of DMA transfer request signals DRQ1 to DRQN sent from the other modules are received in the DMA transfer control unit 2 as a plurality of channel transfer requests respectively. In cases where the plurality of channel transfer requests are received in the DMA transfer control unit 2, the arbitration among the channel transfer requests is performed in the channel transfer request arbitrating circuit (or transfer control means) 3 of the DMA transfer control unit 2, and one channel transfer request is selected to determine the performance of a DMA transfer for the selected channel transfer request. In detail, in the channel transfer request arbitrating circuit 3, priorities are set in advance for the channel transfer requests (or the DMA transfer request signals DRQ1 to DRQN). When a plurality of channel transfer requests are received in the DMA transfer control unit 2, a DMA transfer is assigned to one channel transfer request (hereinafter, called a top priority channel transfer request) having the top priority among those of the channel transfer requests. Thereafter, the DMA transfer for the top priority channel transfer request is first performed in a prescribed procedure. When the DMA transfer for the top priority channel transfer request is completed, a DMA transfer for the channel transfer request having the second priority is performed. Thereafter, the DMA transfers for the other channel transfer requests are performed one after another in the order of lowering the priority of the channel transfer request. Here, the DMA transfer request signal DRQn held in the transfer request holding circuit $20_n$ of the channel control unit $30_n$ is cleared when the DMA transfer for the DMA transfer request signal DRQn is started.

In the channel control unit $30_n$, a count operation of the transfer waiting time counter $40_n$ is started when the DMA transfer request signal DRQn is held in the transfer request holding circuit $20_n$, and the count operation of the transfer waiting time counter $40_n$ is stopped when the DMA transfer request signal DRQn held in the transfer request holding circuit $20_n$ is cleared. Also, a count value (or the number of clock pulses) is counted in the count operation of the transfer waiting time counter $40_n$ of the channel control unit $30_n$, and the count value is output. The count value denotes a transfer waiting time period from the reception of the DMA transfer request signal DRQn in the transfer request holding circuit $20_n$ to the assignment of the DMA transfer to the DMA transfer request signal DRQn. Also, the transfer waiting time counter $40_n$ has a function of holding the number of counted clock pulses as the transfer waiting time period.

In detail, each time the DMA transfer request signal DRQn is received in the transfer request holding circuit $20_n$ of the channel control unit $30_n$, the count operation of the transfer waiting time counter $40_n$ is performed to measure a transfer waiting time period of the DMA transfer request signal DRQn, and the count value denoting the transfer waiting time period of the DMA transfer request signal DRQn is obtained. In cases where a count value obtained in the current count operation is higher than those obtained before the current count operation, the count value obtained in the current count operation is held in the transfer waiting time counter $40_n$ in place of the count value highest among those obtained before the current count operation. Therefore, a maximum count value (or a maximum transfer waiting time period) highest among the count values obtained before is always held in the transfer waiting time counter $40_n$. This maximum count value is, for example, read out by a central processing unit (not shown) and is displayed on a display unit (not shown) as the maximum transfer waiting time period.

Therefore, because the maximum transfer waiting time period obtained in the channel control units $30_1$ to $30_N$ are read out to the central processing unit and are displayed on the display unit, a maximum transfer waiting time period of each of the DMA transfer request signals DRQ1 to DRQN can be grasped by an operator.

As is described above, in the first embodiment, in cases where a plurality of DMA transfers corresponding to a plurality of channels are performed, a maximum transfer waiting time period from the reception of the DMA transfer request to the assignment of the DMA transfer can be grasped for each channel. As a result, a degree of congestion of the DMA transfer requests can be grasped. Also, because the maximum transfer waiting time period from the reception of the DMA transfer request to the assignment of the DMA transfer is grasped for each channel, the priority set in advance for each DMA transfer request can be changed by comparing the maximum transfer waiting time period of the DMA transfer request and a time before a system error occurs. Accordingly, the system error can be prevented.

Embodiment 2

Figure 2:
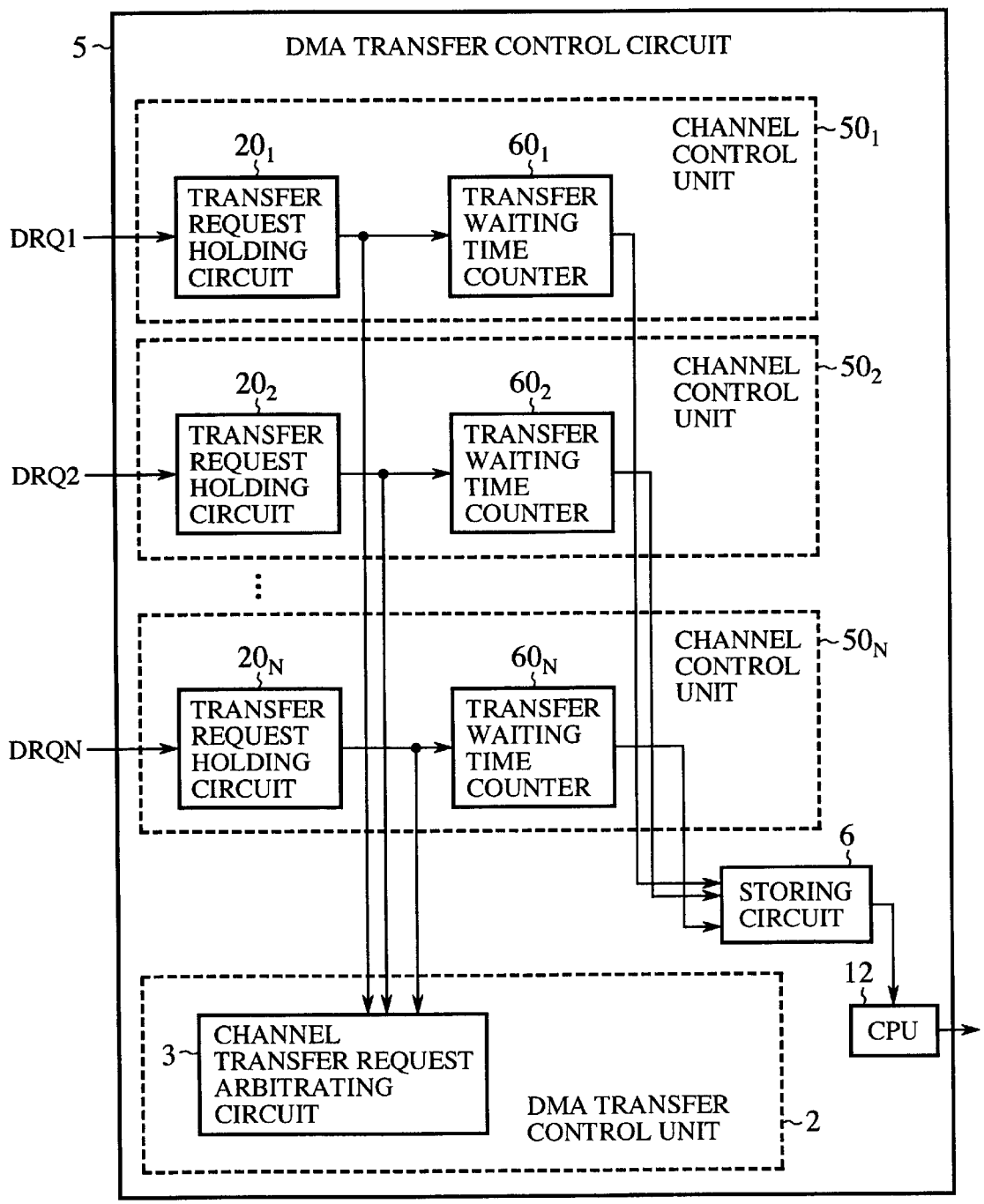
FIG. 2 is a block diagram showing a direct memory access transfer control circuit according to a second embodiment of the present invention.

FIG. 2 is a block diagram showing a direct memory access (DMA) transfer control circuit according to a second embodiment of the present invention. The constituent elements, which are the same as those shown in FIG. 1, are indicated by the same reference numerals as those of the constituent elements shown in FIG. 1, and additional description of those constituent elements is omitted.

In FIG. 2, 5 indicates a DMA transfer control circuit. $50_1$, $50_2$, - - - and $50_N$ indicate a plurality of channel control units respectively. The channel control units $50_1$ to $50_N$ correspond to a plurality of channels respectively. In the channel control units $50_1$ to $50_N$, the transfer request holding circuits $20_1$ to $20_N$ and a plurality of transfer waiting time counters $60_1$, $60_2$, - - - and $60_N$ are disposed respectively. In the DMA transfer control circuit 5, a storing circuit 6 is disposed. A plurality of DMA transfer request signals DRQ1 to DRQN corresponding to the channels are sent from modules other than the DMA transfer control circuit 5 to the channel control units $50_1$ to $50_N$ of the DMA transfer control circuit 5 respectively.

Next, an operation of the DMA transfer control circuit 5 will be described below.

In the same manner as the operation of the transfer waiting time counters $40_1$, $40_2$, - - - and $40_N$ described in the first embodiment with reference to FIG. 1, a count operation of the transfer waiting time counter $60_n$ (n is an arbitrary integral number ranging from 1 to N) is started in the channel control unit $50_n$ when the DMA transfer request signal DRQn is held in the transfer request holding circuit $20_n$, and the count operation of the transfer waiting time counter $60_n$ is stopped when the DMA transfer request signal DRQn held in the transfer request holding circuit $20_n$ is cleared. Also, a count value (or the number of clock pulses) is counted in the count operation of the transfer waiting time counter $60_n$ of the channel control unit $50_n$. The count value denotes a transfer waiting time period from the reception of the DMA transfer request signal DRQn in the transfer request holding circuit $20_n$ to the assignment of the DMA transfer to the DMA transfer request signal DRQn.

In detail, each time the DMA transfer request signal DRQn is received in the transfer request holding circuit $20_n$ of the channel control unit $50_n$, the count operation is performed in the transfer waiting time counter $60_n$, and the count value denoting the transfer waiting time period of the DMA transfer request signal DRQn is obtained. Thereafter, the count value is sent to the storing circuit 6 and is stored. Therefore, the count values (or a plurality of transfer waiting time periods) obtained in the channel control units $50_1$, $50_2$, - - - and $50_N$ are stored in the storing circuit 6.

The count value stored in the storing circuit 6 is, for example, selected and read out by a central processing unit (CPU) 12 for each channel control unit $50_n$ and is displayed on a display unit (not shown) as a transfer waiting time period. The CPU functions as a reading means.

Therefore, because the count value (or the transfer waiting time period) stored in the storing circuit 6 is read out by the CPU 12 for each channel control unit $50_n$ and is displayed on the display unit, the transfer waiting time period from the reception of the DMA transfer request signal DRQn to the assignment of the DMA transfer can be grasped each time the DMA transfer request signal DRQn is received in the channel control unit $50_n$.

As is described above, in the second embodiment, in cases where a plurality of DMA transfers in a plurality of channels are performed, a transfer waiting time period from the reception of the DMA transfer request signal DRQn to the assignment of the DMA transfer can be grasped each time the DMA transfer request signal DRQn is received in the channel control unit $50_n$ corresponding to one channel. That is to say, the transfer waiting time period can be grasped for each channel. Also, because the transfer waiting time period is stored for each DMA transfer request, the order of the DMA transfers performed in response to the DMA transfer request signals DRQ1 to DRQN can be grasped. Also, in cases where a control method adopted in an information processing system and the priorities set in advance for the DMA transfer request signals DRQ1 to DRQN are reconsidered according to the transfer waiting time periods stored in the storing circuit 6, the DMA transfers for the DMA transfer request signals DRQ1 to DRQN can be efficiently performed.

Embodiment 3

Figure 3:
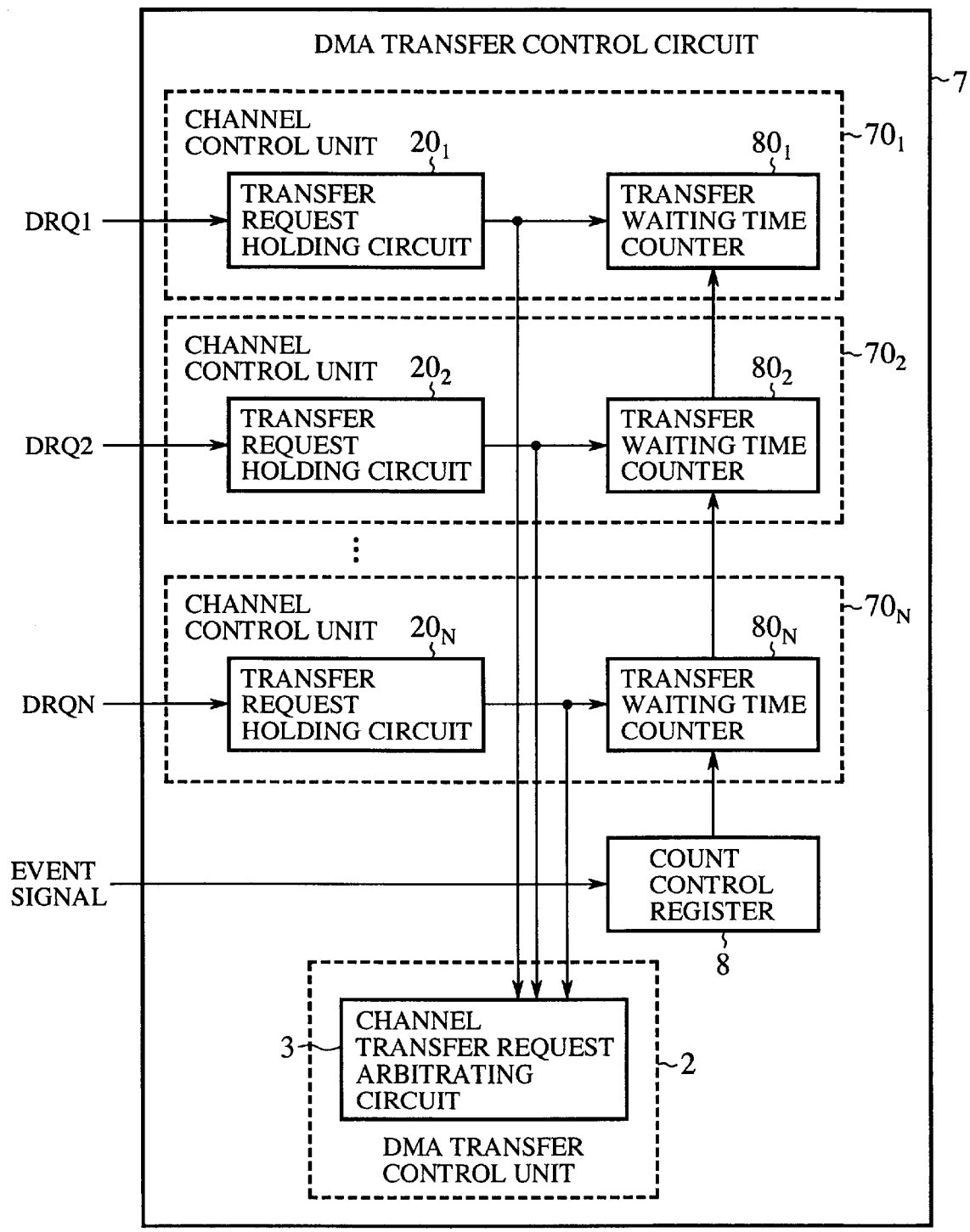
FIG. 3 is a block diagram showing a direct memory access transfer control circuit according to a third embodiment of the present invention.

FIG. 3 is a block diagram showing a direct memory access transfer control circuit according to a third embodiment of the present invention. The constituent elements, which are the same as those shown in FIG. 1, are indicated by the same reference numerals as those of the constituent elements shown in FIG. 1, and additional description of those constituent elements is omitted.

In FIG. 3, 7 indicates a DMA transfer control circuit. $70_1$, $70_2$, - - - and $70_N$ indicate a plurality of channel control units respectively. The channel control units $70_1$ to $70_N$ correspond to a plurality of channels respectively. In the channel control units $70_1$ to $70_N$, the transfer request holding circuits $20_1$ to $20_N$ and a plurality of transfer waiting time counters $80_1$, $80_2$, - - - and $80_N$ are disposed respectively. In the DMA transfer control circuit 7, a count control register (or count control means) 8 of N bits ($b_1$ to $b_N$) is disposed. A plurality of DMA transfer request signals DRQ1 to DRQN corresponding to the channels are sent from modules other than the DMA transfer control circuit 7 to the channel control units $70_1$ to $70_N$ of the DMA transfer control circuit 7 respectively.

Next, an operation of the DMA transfer control circuit 7 will be described below.

When the bit $b_n$ (n is an arbitrary integral number ranging from 1 to N) of the count control register 8 is set to "1", a count enabling signal is sent out from the count control register 8 to the transfer waiting time counter $80_n$ of the channel control unit $70_n$, and the transfer waiting time counter $80_n$ of the channel control unit $70_n$ is set to a count enabling condition in response to the count enabling signal. As is described in the first embodiment shown in FIG. 1, a count operation of the transfer waiting time counter $80_n$ is started when the DMA transfer request signal DRQn is received in the transfer request holding circuit $20_n$ of the channel control unit $70_n$, and the count operation of the transfer waiting time counter $80_n$ is stopped when the DMA transfer request signal DRQn held in the transfer request holding circuit $20_n$ is cleared. Therefore, a transfer waiting time period of the DMA transfer request signal DRQn held in the transfer request holding circuit $20_n$ is measured in the transfer waiting time counter $80_n$. The transfer waiting time counter $80_n$ has a function of holding the transfer waiting time period.

As is described above, in cases where the bit $b_n$ of the count control register 8 is set to "1", the transfer waiting time period of the DMA transfer request signal DRQn held in the transfer request holding circuit $20_n$ is measured each time the DMA transfer request signal DRQn is received in the channel control unit $70_n$, and the transfer waiting time period is held in transfer waiting time counter $80_n$ in cases where the transfer waiting time period obtained in this current count operation is higher than those obtained before the current count operation. Therefore, a maximum transfer waiting time period highest among the transfer waiting time periods obtained is always held in the transfer waiting time counter $80_n$. This maximum transfer waiting time period is, for example, read out by a CPU (not shown) and is displayed on a display unit (not shown).

Also, in cases where the bit $b_n$ of the count control register 8 is cleared to "0", no count enabling signal is sent out from the count control register 8 to the transfer waiting time counter $80_n$ of the channel control unit $70_n$. Therefore, even though the DMA transfer request signal DRQn is held in the transfer request holding circuit $20_n$ of the channel control unit $70_n$, no count operation is started in the transfer waiting time counter $80_n$.

The writing of "1" to the bit $b_n$ of the count control register 8 and the clearing of the bit $b_n$ to "0" are performed under the control of the CPU. In other words, each bit selected from the bits $b_1$ to $b_N$ of the count control register 8 is set to "1" or is cleared to "0" under the control of the CPU. For example, when a command input to an input device is received in the CPU, each bit selected from the bits $b_1$ to $b_N$ of the count control register 8 is set to "1" or is cleared to "0" according to the command under the control of the CPU.

Here, it is applicable that all the bits $b_1$ to $b_N$ of the count control register 8 be simultaneously set to "1" or be simultaneously cleared to "0". In this case, when an event signal producing command is input to an input device and is received in the CPU, an event signal is produced in the CPU and is sent to the count control register 8. The event signal is, for example, expressed by bit data "1" or "0". When the event signal is expressed by the bit data "1", all the bits $b_1$ to $b_N$ of the count control register 8 are simultaneously set to "1", a plurality of count enabling signals are respectively sent from the count control register 8 to the transfer waiting time counters $80_1$ to $80_N$, and each of the transfer waiting time counters $80_1$ to $80_N$ is set to a count enabling condition.

In contrast, when the event signal is expressed by the bit data "0", all the bits $b_1$ to $b_N$ of the count control register 8 are simultaneously cleared to "0", no count enabling signal is sent from the count control register 8 to each of the transfer waiting time counters $80_1$ to $80_N$, and no transfer waiting time counters $80_1$ to $80_N$ are set to a count enabling condition. Therefore, even though the DMA transfer request signals DRQ1 to DRQN are held in the transfer request holding circuit $20_1$ to $20_N$ of the channel control unit $70_1$ to $70_N$ respectively, no count operation is started in the transfer waiting time counters $80_1$ to $80_N$.

Therefore, because the transfer waiting time period is selectively measured for each of the DMA transfer request signals DRQ1 to DRQN held in the channel control unit $70_1$ to $70_N$, the transfer waiting time period can be measured in case of necessity for each of DMA transfer request signals DRQ1 to DRQN. Also, the transfer waiting time counters $80_1$ to $80_N$ can be respectively set to the count enabling condition to measure all the transfer waiting time periods of the DMA transfer request signals DRQ1 to DRQN in the channel control units $70_1$ to $70_N$.

Here, in the third embodiment, the maximum transfer waiting time period is held in each of the transfer waiting time counters $80_1$ to $80_N$ in the same manner as in the first embodiment. However, as is described in the second embodiment, it is applicable that a storing circuit be disposed in the DMA transfer control circuit 7 to store all transfer waiting time periods in the storing circuit for each of the transfer waiting time counters $80_1$ to $80_N$.

As is described above, in the third embodiment, in cases where a plurality of DMA transfers in a plurality of channels are performed, a transfer waiting time period from the reception of the DMA transfer request signal DRQn to the assignment of the DMA transfer can be grasped each time the DMA transfer request signal DRQn is received in the channel control unit $70_n$ corresponding to one channel. That is to say, the transfer waiting time period can be grasped for each channel. Also, because the performance of the count operation can be set for each of the channel control unit $70_1$ to $70_N$, a degree of congestion of the DMA transfers can be minutely grasped.

Embodiment 4

Figure 4:
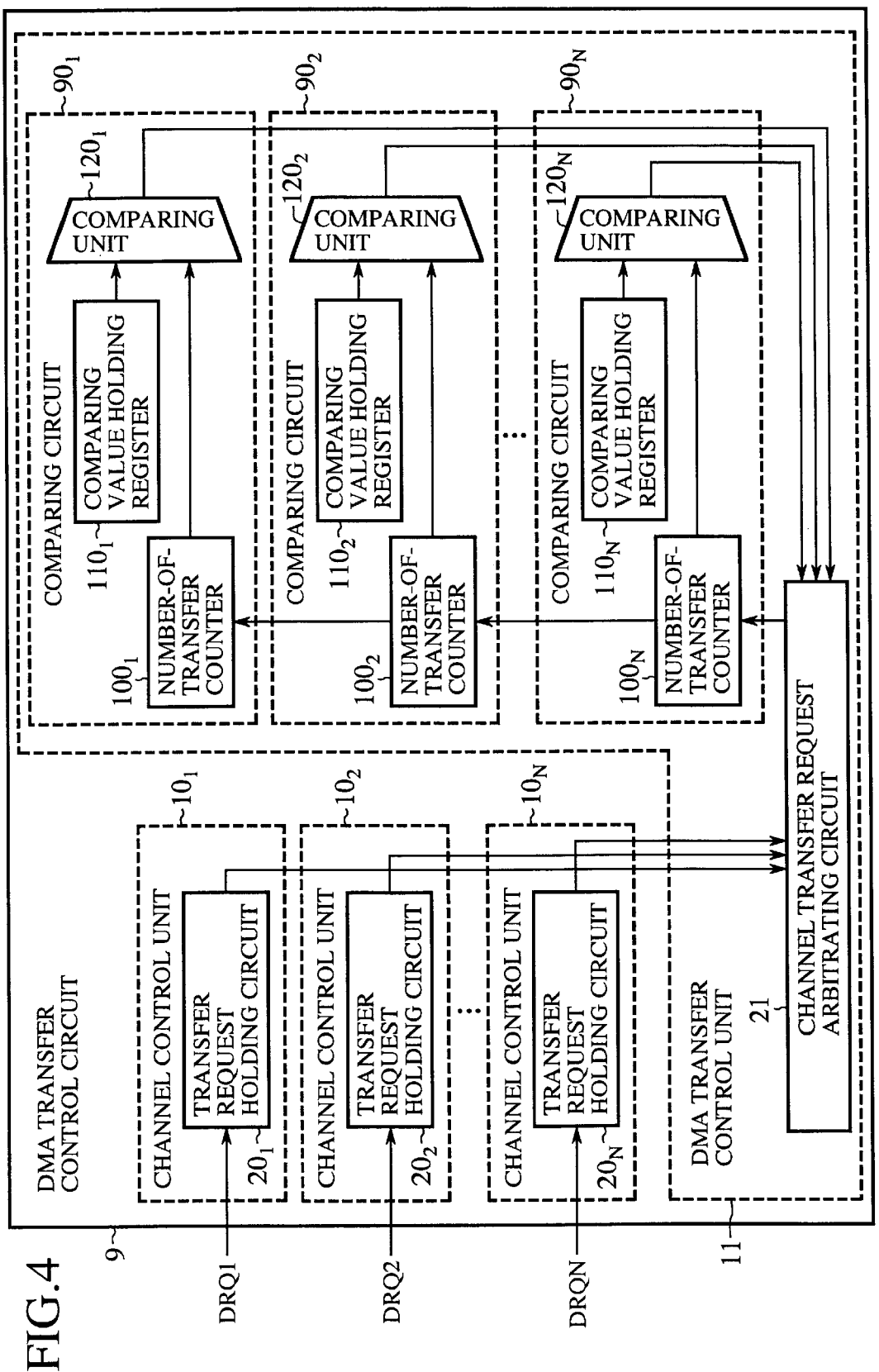
FIG. 4 is a block diagram showing a direct memory access transfer control circuit according to a fourth embodiment of the present invention.

FIG. 4 is a block diagram showing a direct memory access transfer control circuit according to a fourth embodiment of the present invention. The constituent elements, which are the same as those shown in FIG. 1, are indicated by the same reference numerals as those of the constituent elements shown in FIG. 1, and additional description of those constituent elements is omitted.

In FIG. 4, 9 indicates a DMA transfer control circuit. $10_1$, $10_2$, - - - and $10_N$ indicate a plurality of channel control units respectively. The channel control units $10_1$ to $10_N$ correspond to a plurality of channels respectively. In the channel control units $10_1$ to $10_N$, the transfer request holding circuits $20_1$ to $20_N$ are disposed. In the DMA transfer control circuit 9, a DMA transfer control unit 11 is disposed. In the DMA transfer control unit 11, a channel transfer request arbitrating circuit (or priority changing means) 21 and a plurality of comparing circuits $90_1$, $90_2$, - - - and $90_N$ are disposed. The comparing circuits $90_1$ to $90_N$ correspond to the channels respectively. Therefore, the comparing circuits $90_1$ to $90_N$ correspond to the channel control units $10_1$ to $10_N$ respectively.

In the comparing circuits $90_1$ to $90_N$, a plurality of number-of-transfer counters (or counting means) $100_1$, $100_2$, - - - and $100_N$, a plurality of comparing value holding registers (or comparing means) $110_1$, $110_2$, - - - and $110_N$ and a plurality of comparing units (or comparing means) $120_1$, $120_2$, - - - and $120_N$ are disposed. In each number-of-transfer counter $100_n$ (n is an arbitrary integral number ranging from 1 to N), the number of DMA transfers performed in response to a plurality of transfer request signals DRQn is counted, and an n-th transfer count value is sent out. In each comparing value holding register $110_n$, a prescribed value is held as an n-th comparing value. In each comparing unit $120_n$, the n-th transfer count value is compared with the n-th comparing value. In cases where the n-th transfer count value agrees with the n-th comparing value, an n-th comparison result agreement signal indicating the agreement of the n-th transfer count value with the n-th comparing value is sent out from the comparing unit $120_n$ to the channel transfer request arbitrating circuit 21.

Next, an operation of the DMA transfer control circuit 9 will be described below.

When a DMA transfer request signal DRQn is input to the channel control unit $10_n$ of the DMA transfer control circuit 9, the DMA transfer request signal DRQn is once held in the transfer request holding circuit $20_n$ of the channel control unit $10_n$. Thereafter, the DMA transfer request signal DRQn held in the transfer request holding circuit $20_n$ is fed to the DMA transfer control unit 11 as a channel transfer request. Therefore, a plurality of DMA transfer request signals DRQ1 to DRQN sent from modules other than the DMA transfer control circuit 9 are received in the DMA transfer control unit 11 as a plurality of channel transfer requests respectively.

In cases where the plurality of channel transfer requests are received in the DMA transfer control unit 11, the arbitration among the channel transfer requests is performed in the channel transfer request arbitrating circuit 21 of the DMA transfer control unit 11, and one channel transfer request is selected to determine the performance of a DMA transfer for the selected channel transfer request. In detail, in the channel transfer request arbitrating circuit 21, priorities are set in advance for the channel transfer requests (or the DMA transfer request signals DRQ1 to DRQN). When a plurality of channel transfer requests are received in the DMA transfer control unit 11, a DMA transfer is assigned to one channel transfer request (hereinafter, called a top priority channel transfer request) having the top priority among those of the channel transfer requests. Thereafter, the DMA transfer for the top priority channel transfer request is first performed in a prescribed procedure. When the DMA transfer for the top priority channel transfer request is completed, a DMA transfer for the channel transfer request having the second priority is performed. Thereafter, the DMA transfers for the other channel transfer requests are performed one after another in the order of lowering the priority of the channel transfer request.

For example, when the DMA transfer is performed in response to the DMA transfer request signal DRQn, a count value is incremented by one in the number-of-transfer counter $100_n$, and an n-th transfer count value indicating the incremented count value is fed to the comparing unit $120_n$. Here, the n-th transfer count value is fed to the comparing unit $120_n$ each time the count value is incremented by one. Also, because a prescribed value is held in advance as an n-th comparing value in the comparing value holding register $110_n$, the n-th comparing value is fed from the comparing value holding register $110_n$ to the comparing unit $120_n$. In the comparing unit $120_n$, the n-th transfer count value is compared with the n-th comparing value. In cases where the n-th transfer count value agrees with the n-th comparing value, an n-th comparison result agreement signal is sent out to the channel transfer request arbitrating circuit 21. Here, the first to N-th comparing values held in the comparing value holding registers $110_1$ to $110_N$ are determined in advance according to the priorities set in advance for the DMA transfer request signals DRQ1 to DRQN.

In the channel transfer request arbitrating circuit 21, when the n-th comparison result agreement signal is received, the priorities set in advance for the DMA transfer request signals DRQ1 to DRQN are changed. For example, when the n-th comparison result agreement signal corresponding to the n-th channel is received, the lowest priority is assigned to the DMA transfer request signal DRQn corresponding to the n-th channel. Here, in cases where a plurality of remarked comparison result agreement signals corresponding to a plurality of remarked channels are received in the channel transfer request arbitrating circuit 21, the priorities set in advance for a plurality of remarked DMA transfer request signals corresponding to the remarked channels are changed according to a prescribed method. For example, the priorities set in advance for the remarked DMA transfer request signals are considered, and the lowest priority is set for one remarked DMA transfer request signal which has the lowest priority among those set in advance for the remarked DMA transfer request signals. That is to say, in cases where priorities are set in advance for the DMA transfer request signals DRQ1 to DRQN corresponding to the N channels, when three remarked comparison result agreement signals are, for example, received in the channel transfer request arbitrating circuit 21, the lowest priority is set for one remarked DMA transfer request signal DRQ which has the lowest priority among those set in advance for the three remarked DMA transfer request signals.

An example of a DMA transfer control operation will be described with reference to FIG. 5.

Figure 5:
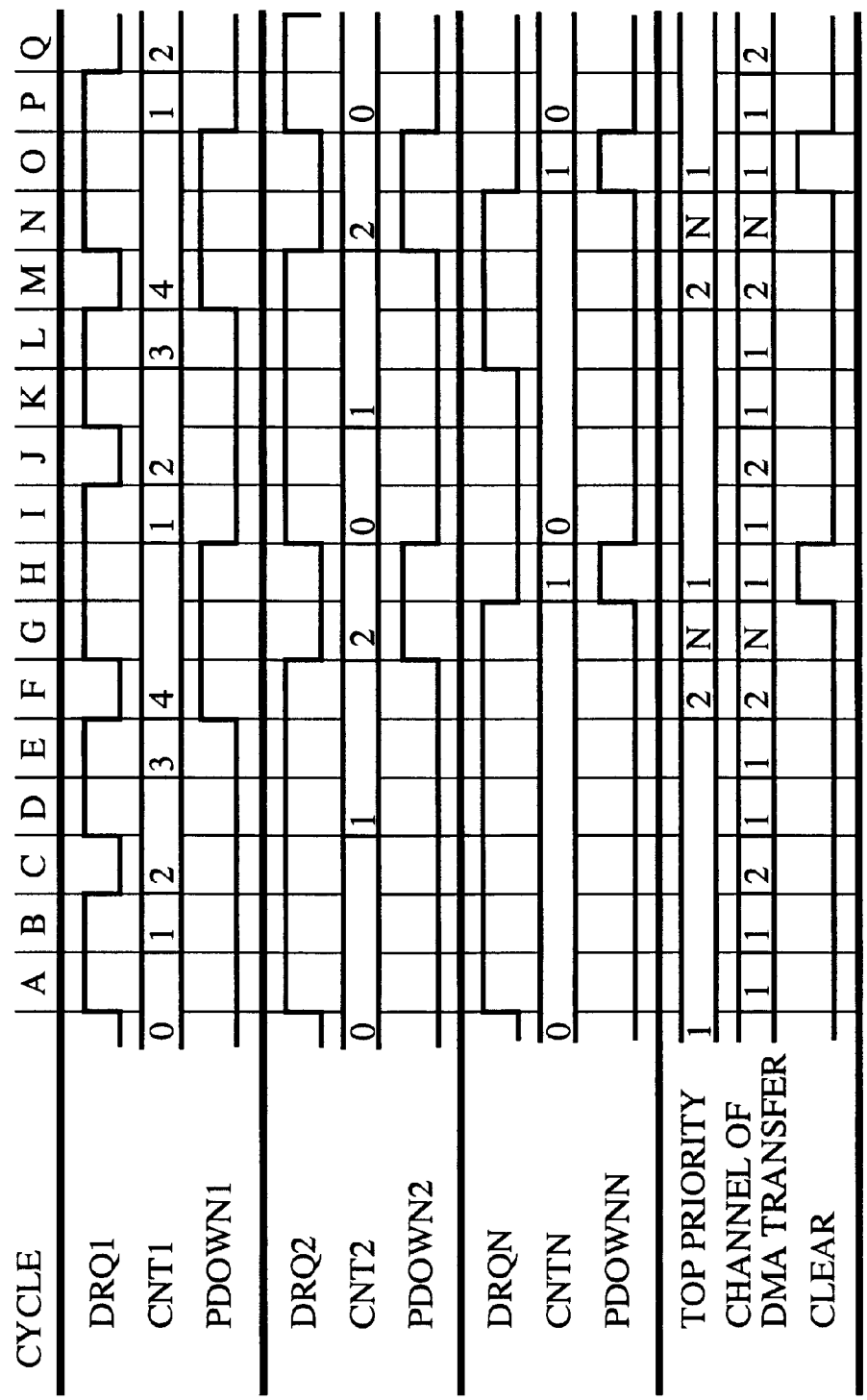
FIG. 5 is a timing chart explaining an operation in the direct memory access transfer control circuit shown in FIG. 4.

FIG. 5 is a timing chart explaining an operation of the direct memory access (DMA) transfer control circuit 9 shown in FIG. 4. In this example shown in FIG. 5, the first comparing value set to "4" the second comparing value set to "2" and the Nth comparing value set to "1" are held in advance in the comparing value holding registers $110_1$, $110_2$ and $110_N$ respectively. In this case, it is assumed that the channel control units $10_1$, $10_2$ and $10_N$, the comparing circuits $90_1$, $90_2$ and $90_N$ are disposed in the DMA transfer control circuit 9. In FIG. 5, the first transfer count value, the second transfer count value and the N-th transfer count value are expressed by CNT1, CNT2 and CNTN respectively. The first comparison result agreement signal, the second comparison result agreement signal and the N-th comparison result agreement signal are expressed by PDOWN1, PDOWN2 and PDOWNN respectively. In the example shown in FIG. 5, the DMA transfer request signals DRQ1, DRQ2 and DRQN are fed to the channel control units $10_1$, $10_2$ and $10_N$ of the DMA transfer control circuit 9, and the priorities set in advance for the DMA transfer request signals DRQ1, DRQ2 and DRQN in the channel transfer request arbitrating circuit 21 are expressed by DRQ1>DRQ2>DRQN. That is to say, the DMA transfer request signal DRQ1 has the top priority, and the DMA transfer request signal DRQN has the lowest priority.

When a DMA transfer control operation is started, the DMA transfer request signals DRQ1, DRQ2 and DRQN are respectively set to the high (H) level in a first cycle A. Because the DMA transfer request signal DRQ1 has the top priority (the DMA transfer request signal DRQ1 having the top priority is indicated by "1" in FIG. 5), a DMA transfer in the first channel corresponding to the DMA transfer request signal DRQ1 is determined in the channel transfer request arbitrating circuit 21 (the channel of the DMA transfer is indicated by "1" in FIG. 5). When the DMA transfer for the DMA transfer request signal DRQ1 in the first channel is performed, the count value (or the first transfer count value) in the number-of-transfer counter $100_1$ is incremented by one and is set to "1". In this case, because the first transfer count value of "1" does not agree with the first comparing value of "4", no priority change is performed.

Thereafter, in a cycle B, the DMA transfer request signals DRQ1, DRQ2 and DRQN are respectively set to the H level. Because the top priority is still set for the DMA transfer request signal DRQ1, the DMA transfer for the DMA transfer request signal DRQ1 is performed under the control of the channel transfer request arbitrating circuit 21, and the count value in the number-of-transfer counter $100_1$ is incremented by one and is set to "2".

Thereafter, in a cycle C, the DMA transfer request signal DRQ1 is set to the low (L) level, and the DMA transfer request signals DRQ2 and DRQN are respectively set to the H level. Because the priority set for the DMA transfer request signal DRQ2 is higher than that set for the DMA transfer request signal DRQN, the DMA transfer for the DMA transfer request signal DRQ2 is performed under the control of the channel transfer request arbitrating circuit 21 (the channel of the DMA transfer is indicated by "2" in FIG. 5), and a count value in the number-of-transfer counter $100_2$ is incremented by one and is set to "1".

Thereafter, in each of cycles D and E, the DMA transfer for the DMA transfer request signal DRQ1 is performed in the same manner as in the cycle B. Therefore, the count value (or the first transfer count value) in the number-of-transfer counter $100_1$ is set to "4". Because the first comparing value held in the comparing value holding registers $110_1$ is set to "4", the first transfer count value agrees with the first comparing value in the comparing unit $120_1$, and a first comparison result agreement signal PDOWN1 set to the H level is fed to the channel transfer request arbitrating circuit 21. In the channel transfer request arbitrating circuit 21, the priority for the DMA transfer request signal DRQ1 corresponding to the first channel is changed to the lowest priority in response to the first comparison result agreement signal PDOWN1. As a result, in a cycle F, the priorities set for the DMA transfer request signals DRQ1, DRQ2 and DRQN are expressed by DRQ2>DRQN>DRQ1 (the DMA transfer request signal DRQ2 having the top priority is indicated by "2" in FIG. 5).

Thereafter, in the cycle F, the DMA transfer for the DMA transfer request signal DRQ2 is performed, and the count value (or the second transfer count value) in the number-of-transfer counter $100_2$ is incremented by one and is set to "2". Because the second comparing value held in the comparing value holding registers $110_2$ is set to "2", the second transfer count value agrees with the second comparing value in the comparing unit $120_2$, and a second comparison result agreement signal PDOWN2 set to the H level is fed to the channel transfer request arbitrating circuit 21. In the channel transfer request arbitrating circuit 21, the priority for the DMA transfer request signal DRQ2 corresponding to the second channel is changed to the lowest priority in response to the second comparison result agreement signal PDOWN2. As a result, in a cycle G, the priorities set for the DMA transfer request signals DRQ1, DRQ2 and DRQN are expressed by DRQN>DRQ1>DRQ2 (the DMA transfer request signal DRQN having the top priority is indicated by "N" in FIG. 5).

Thereafter, in the cycle G, the DMA transfer for the DMA transfer request signal DRQN is performed, and the count value (or the N-th transfer count value) in the number-of-transfer counter $100_N$ is incremented by one and is set to "1". Because the N-th comparing value held in the comparing value holding registers $110_N$ is set to "1", the N-th transfer count value agrees with the N-th comparing value in the comparing unit $120_N$, and an N-th comparison result agreement signal PDOWNN set to the H level is fed to the channel transfer request arbitrating circuit 21. In the channel transfer request arbitrating circuit 21, the priority for the DMA transfer request signal DRQN corresponding to the N-th channel is changed to the lowest priority in response to the N-th comparison result agreement signal PDOWNN. As a result, in a cycle H, the priorities set for the DMA transfer request signals DRQ1, DRQ2 and DRQN are expressed by DRQ1>DRQ2>DRQN (the DMA transfer request signal DRQ1 having the top priority is indicated by "1" in FIG. 5).

Thereafter, in the cycle H, because all the comparison result agreement signals PDOWN1, PDOWN2 and PDOWNN are set to the H level respectively in the cycles before the cycle H, a number-of-transfer counter clear signal CLEAR set to the H level is fed from the CPU (not shown) to the number-of-transfer counters $100_1$, $100_2$, - - - and $100_N$, and the transfer count values of the number-of-transfer counters $100_1$, $100_2$, - - - and $100_N$ are cleared (or reset) to zero in response to the number-of-transfer counter clear signal CLEAR. Thereafter, the DMA transfer for the DMA transfer request signal DRQ1 is performed, and the count value (or the first transfer count value) in the number-of-transfer counter $100_1$ is incremented by one and is set to "1".

Thereafter, the DMA transfer for the DMA transfer request signal DRQ1, the DMA transfer for the DMA transfer request signal DRQ2, the DMA transfer for the DMA transfer request signal DRQ1 and the DMA transfer for the DMA transfer request signal DRQ1 are performed in cycles I, J, K and L in that order respectively. When the cycle L is completed, the count value (or the first transfer count value) in the number-of-transfer counter $100_1$ is set to "4". Because the first comparing value held in the comparing value holding registers $110_1$ is set to "4", the first transfer count value agrees with the first comparing value in the comparing unit $120_1$, and a first comparison result agreement signal PDOWN1 set to the H level is fed to the channel transfer request arbitrating circuit 21. In the channel transfer request arbitrating circuit 21, the priority for the DMA transfer request signal DRQ1 corresponding to the first channel is changed to the lowest priority in response to the first comparison result agreement signal PDOWN1. As a result, in a cycle M, the priorities set for the DMA transfer request signals DRQ1, DRQ2 and DRQN are expressed by DRQ2>DRQN>DRQ1 (the DMA transfer request signal DRQ2 having the top priority is indicated by "2" in FIG. 5).

Thereafter, in the cycle M, the DMA transfer for the DMA transfer request signal DRQ2 is performed, and the count value (or the second transfer count value) in the number-of-transfer counter $100_2$ is incremented by one and is set to "2". Because the second transfer count value agrees with the second comparing value in the comparing unit $120_2$, a second comparison result agreement signal PDOWN2 set to the H level is fed to the channel transfer request arbitrating circuit 21. In the channel transfer request arbitrating circuit 21, the priority for the DMA transfer request signal DRQ2 is changed to the lowest priority in response to the second comparison result agreement signal PDOWN2. As a result, in a cycle N, the priorities set for the DMA transfer request signals DRQ1, DRQ2 and DRQN are expressed by DRQN>DRQ1>DRQ2 (the DMA transfer request signal DRQN having the top priority is indicated by "N" in FIG. 5).

Thereafter, in the cycle N, the DMA transfer for the DMA transfer request signal DRQN is performed, and the count value (or the N-th transfer count value) in the number-of-transfer counter $100_N$ is incremented by one and is set to "1".

Because the N-th transfer count value agrees with the N-th comparing value in the comparing unit $120_N$, an N-th comparison result agreement signal PDOWNN set to the H level is fed to the channel transfer request arbitrating circuit 21. In the channel transfer request arbitrating circuit 21, the priority for the DMA transfer request signal DRQN is changed to the lowest priority in response to the N-th comparison result agreement signal PDOWNN. As a result, in a cycle O, the priorities set for the DMA transfer request signals DRQ1, DRQ2 and DRQN are expressed by DRQ1>DRQ2>DRQN (the DMA transfer request signal DRQ1 having the top priority is indicated by "1" in FIG. 5).

Thereafter, in the cycle O, because all the comparison result agreement signals PDOWN1, PDOWN2 and PDOWNN have been already set to the H level respectively, the transfer count values of the number-of-transfer counters $100_1$, $100_2$, - - - and $100_N$ are cleared (or reset) to zero in response to the number-of-transfer counter clear signal CLEAR. Thereafter, the DMA transfer for the DMA transfer request signal DRQ1, the DMA transfer for the DMA transfer request signal DRQ1 and the DMA transfer for the DMA transfer request signal DRQ2 are performed in cycles O, P and Q respectively in that order. Thereafter, the DMA transfer is continued.

In the example shown in FIG. 5, in the cycles A to N, the DMA transfer for the DMA transfer request signal DRQ1 is performed eight times, the DMA transfer for the DMA transfer request signal DRQ2 is performed four times, and the DMA transfer for the DMA transfer request signal DRQN is performed twice. The ratio (8:4:2) among the number of DMA transfers for the DMA transfer request signals DRQ1, the number of DMA transfers for the DMA transfer request signals DRQ2 and the number of DMA transfers for the DMA transfer request signals DRQN is equal to the ratio (4:2:1) among the first comparing value held in the comparing value holding registers $110_1$, the second comparing value held in the comparing value holding registers $110_2$ and the N-th comparing value held in the comparing value holding registers $110_N$.

Figure 6:
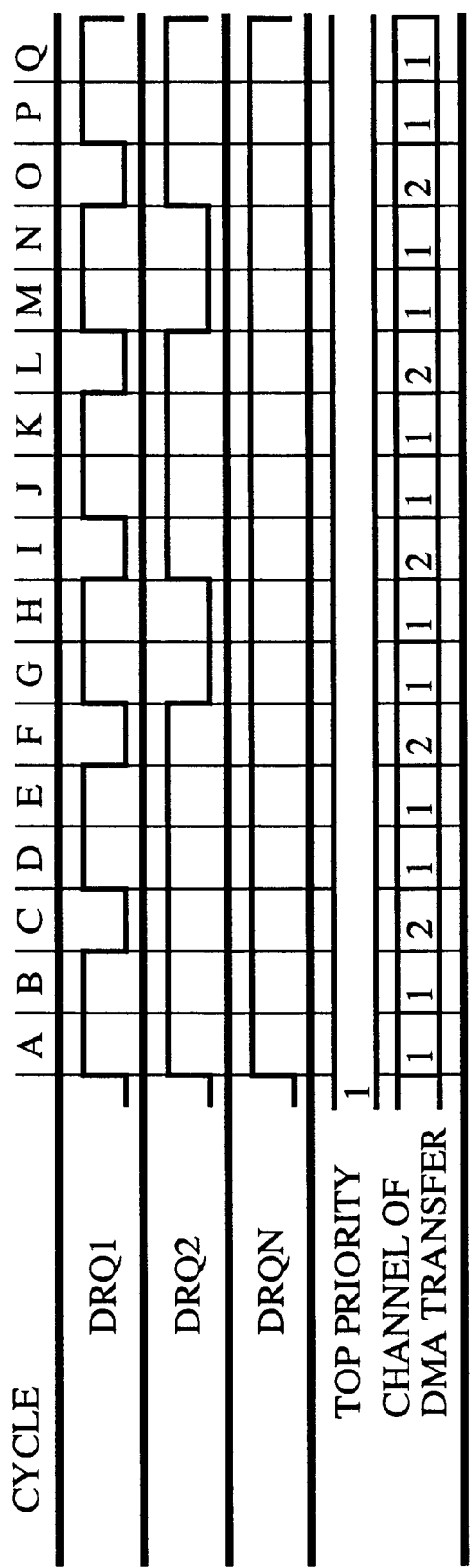
FIG. 6 is a timing chart explaining an operation in a conventional direct memory access transfer control circuit.

To compare the operation in the DMA transfer control circuit 9 with the operation in the conventional DMA transfer control circuit 1 shown in FIG. 9, a DMA transfer control operation performed in the conventional DMA transfer control circuit 1 shown in FIG. 9 is shown in FIG. 6. In the conventional DMA transfer control circuit 1, the priorities for the DMA transfer request signals DRQ1, DRQ2 and DRQN are fixed to DRQ1>DRQ2>DRQN in advance. Also, the DMA transfer request signals DRQ1, DRQ2 and DRQN set to the H level are fed to the conventional DMA transfer control circuit 1 in the cycles A to Q at the input timing shown in FIG. 6. As a result, in the cycles A to N of the example shown in FIG. 6, the DMA transfer for the DMA transfer request signal DRQ1 is performed ten times, the DMA transfer for the DMA transfer request signal DRQ2 is performed four times, and no DMA transfer for the DMA transfer request signal DRQN is performed. Even though the DMA transfer request signals DRQN set to the high level are consecutively fed to the conventional DMA transfer control circuit 1 in all the cycles A to N, because the DMA transfer request signal DRQ1 or DRQ2 is always fed to the conventional DMA transfer control circuit 1 in the cycles A to N, no DMA transfer for the DMA transfer request signal DRQN can be performed.

As is described above, in the fourth embodiment, in cases where the n-th transfer count value obtained in the number-of-transfer counter $100_n$ agrees with the n-th comparing value held in the comparing value holding register $110_n$, the priorities set in advance for the DMA transfer request signals DRQ1 to DRQN are changed. Therefore, there is no probability that no DMA transfer is performed for the DMA transfer request signal set to a lower priority in advance. In detail, the N comparing values held in the comparing value holding registers $110_1$, $110_2$, - - - and $110_N$ are set in advance according to the priorities set in advance for the DMA transfer request signals DRQ1 to DRQN. In cases where the n-th transfer count value obtained in the number-of-transfer counter $100_n$ agrees with the n-th comparing value held in the comparing value holding register $110_n$, the lowest priority is set for the DMA transfer request signal DRQn. In this case, the DMA transfers for the DMA transfer request signals DRQ1 to DRQN can be performed in a prescribed ratio among the number of DMA transfers for the DMA transfer request signals DRQ1, the number of DMA transfers for the DMA transfer request signals DRQ2, - - - and the number of DMA transfers for the DMA transfer request signals DRQN. Accordingly, there is no probability that no DMA transfer is performed for the DMA transfer request signal set to a lower priority in advance.

Embodiment 5

Figure 7:
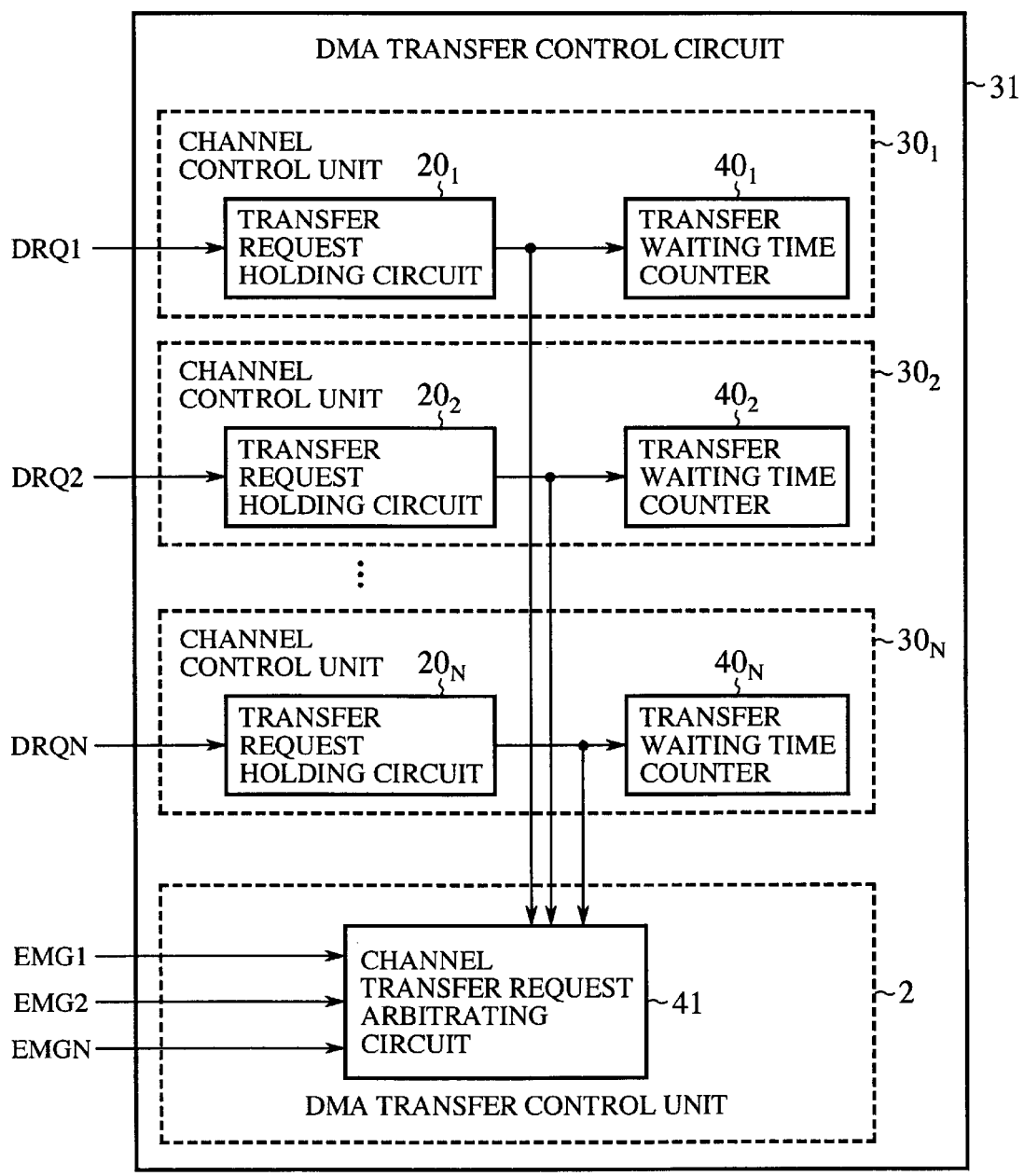
FIG. 7 is a block diagram showing a direct memory access transfer control circuit according to a fifth embodiment of the present invention.

FIG. 7 is a block diagram showing a direct memory access transfer control circuit according to a fifth embodiment of the present invention. The constituent elements, which are the same as those shown in FIG. 1, are indicated by the same reference numerals as those of the constituent elements shown in FIG. 1, and additional description of those constituent elements is omitted.

In FIG. 7, 31 indicates a DMA transfer control circuit. The channel control units $30_1$ to $30_N$ corresponding to a plurality of channels respectively are disposed in the DMA transfer control circuit 31. In the channel control units $30_1$ to $30_N$, the transfer request holding circuits $20_1$ to $20_N$ and the transfer waiting time counters $40_1$ to $40_N$ are disposed respectively. In the DMA transfer control unit 2, a channel transfer request arbitrating circuit (or assigning means) 41 is disposed. A plurality of DMA transfer request signals DRQ1 to DRQN are sent from modules other than the DMA transfer control circuit 31 to the channel control units $30_1$ to $30_N$ of the DMA transfer control circuit 31 respectively.

Next, an operation of the DMA transfer control circuit 31 will be described below.

In the same manner as in the first embodiment shown in FIG. 1, a plurality of DMA transfer request signals DRQ1 to DRQN sent from the other modules are fed to the DMA transfer control unit 2 as a plurality of channel transfer requests respectively. In cases where the plurality of channel transfer requests are received in the DMA transfer control unit 2, the arbitration among the channel transfer requests is performed in the channel transfer request arbitrating circuit 41 of the DMA transfer control unit 2, and one channel transfer request is selected to determine the performance of a DMA transfer for the selected channel transfer request. In detail, in the channel transfer request arbitrating circuit 41, priorities are set in advance for the channel transfer requests (or the DMA transfer request signals DRQ1 to DRQN). When a plurality of channel transfer requests are received in the DMA transfer control unit 2, a DMA transfer is set for the priority channel transfer request (hereinafter, called a top priority channel transfer request) having the top priority among those of the channel transfer requests. Thereafter, the DMA transfer for the top priority channel transfer request is first performed in a prescribed procedure. When the DMA transfer for the top priority channel transfer request is completed, a DMA transfer for the channel transfer request having the second priority is performed. Thereafter, the DMA transfers for the other channel transfer requests are performed one after another in the order of lowering the priority of the channel transfer request.

Also, a transfer waiting time period of the DMA transfer request signal DRQn (n is an arbitrary integral number ranging from 1 to N) held in each transfer request holding circuit $20_n$ is measured in the transfer waiting time counter $40_n$ of the channel control unit $30_n$.

In the above-described operation, a following case is assumed as an example. Priorities expressed by DRQ1>DRQ2>----->DRQN are set in advance for the DMA transfer request signals DRQ1 to DRQN, the DMA transfer request signal DRQ1 of the first channel set to the H level is consecutively fed to the transfer request holding circuit $20_1$, and the DMA transfer request signal DRQ2 of the second channel set to the H level is held in the transfer request holding circuit $20_2$ in a remarked cycle. In this case, because the DMA transfer for the DMA transfer request signal DRQ1 is consecutively performed under the control of the channel transfer request arbitrating circuit 41 according to the priorities set in advance, no DMA transfer for the DMA transfer request signal DRQ2 is promptly performed in the remarked cycle.

In this embodiment, in cases where no DMA transfer for the DMA transfer request signal DRQ2 is performed on condition that a prescribed time passes after the DMA transfer request signal DRQ2 set to the H level is held in the transfer request holding circuit $20_2$, an emergency transfer request signal EMG2 is directly sent out from a module (or a transfer requiring factor) corresponding to the second channel to the channel transfer request arbitrating circuit 41. When the emergency transfer request signal EMG2 is received in the channel transfer request arbitrating circuit 41, all DMA transfer request signals (in this case, the DMA transfer request signal DRQ1) having priorities higher than that of the DMA transfer request signal DRQ2 are overridden in the channel transfer request arbitrating circuit 41 in response to the emergency transfer request signal EMG2, and the DMA transfer is assigned to the DMA transfer request signal DRQ2 corresponding to the module of the emergency transfer request signal EMG2 in the channel transfer request arbitrating circuit 41. Therefore, the DMA transfer for the DMA transfer request signal DRQ2 is performed under the control of the channel transfer request arbitrating circuit 41.

As is described above, in the fifth embodiment, in cases where no DMA transfer for a DMA transfer request signal DRQn corresponding to an n-th channel is performed on condition that a prescribed time passes after the DMA transfer request signal DRQn set to the H level is received and held in the transfer request holding circuit $20_n$, an emergency transfer request signal EMGn is directly sent out from a module corresponding to the channel to the channel transfer request arbitrating circuit 41. Therefore, all DMA transfer request signals having priorities higher than that of the DMA transfer request signal DRQn are overridden in the channel transfer request arbitrating circuit 41 in response to the emergency transfer request signal EMGn, and the DMA transfer is assigned to the DMA transfer request signal DRQn in the channel transfer request arbitrating circuit 41. Accordingly, there is no probability that no DMA transfer for the DMA transfer request signal DRQn is performed for a long time after the sending-out of the DMA transfer request signal DRQn, and the DMA transfer control circuit 31 can prevent the occurrence of a system error.

Embodiment 6

Figure 8:
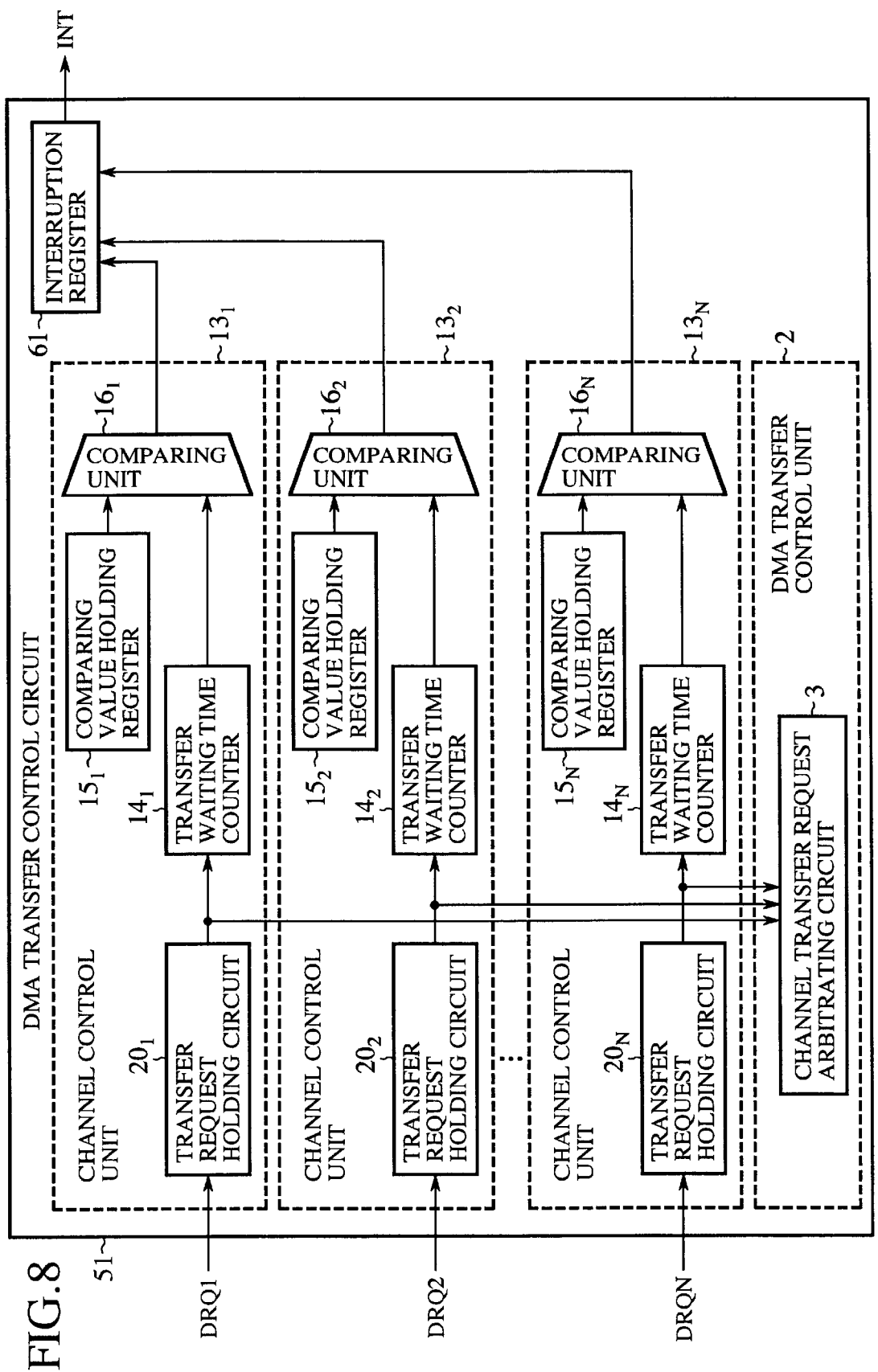
FIG. 8 is a block diagram showing a direct memory access transfer control circuit according to a sixth embodiment of the present invention.

FIG. 8 is a block diagram showing a direct memory access transfer control circuit according to a sixth embodiment of the present invention. The constituent elements, which are the same as those shown in FIG. 1, are indicated by the same reference numerals as those of the constituent elements shown in FIG. 1, and additional description of those constituent elements is omitted.

In FIG. 8, 51 indicates a DMA transfer control circuit. $13_1$, $13_2$, ---- and $13_N$ indicate a plurality of channel control units respectively. The channel control units $13_1$ to $13_N$ are disposed in the DMA transfer control circuit 51 and correspond to a plurality of channels respectively. In the channel control units $13_1$ to $13_N$ the transfer request holding circuits $20_1$ to $20_N$, a plurality of transfer waiting time counters $14_1$, $14_2$, ---- and $14_N$, a plurality of comparing value holding registers (or comparing means) $15_1$, $15_2$, ---- and $15_N$ and a plurality of comparing units (or comparing means) $16_1$, $16_2$, ---- and $16_N$ are disposed. In the DMA transfer control circuit 51, the DMA transfer control unit 2 and an interruption register (or interrupting means) 61 are disposed.

In each transfer waiting time counter $14_n$ (n is an arbitrary integral number ranging from 1 to N), when a DMA transfer request signal DRQn is held in the transfer request holding circuit $20_n$, a count operation is started, and an n-th count signal indicating a count value is sent out. Thereafter, when the DMA transfer request signal DRQn held in the transfer request holding circuit $20_n$ is cleared, the count operation of the transfer waiting time counters $14_n$ is stopped, and the n-th count signal is reset. Also, a prescribed value is held in advance in each comparing value holding register $15_n$ as an n-th comparing value. In the comparing unit $16_n$, the count value indicated by the n-th count signal of the transfer waiting time counter $14_n$ is compared with the n-th comparing value of the comparing value holding register $15_n$. In cases where the count value agrees with the n-th comparing value, an n-th comparison result agreement signal is fed from the comparing unit $16_n$ to the interruption register 61. In the interruption register 61, an n-th interruption request signal INT is sent out to an interruption controller (not shown) in response to the n-th comparison result agreement signal. Here, the combination of the interruption register 61 and the interruption controller functions as an interruption means.

Next, an operation of the DMA transfer control circuit 51 will be described below.

Before the starting of the DMA transfer, a plurality of comparing values (a first comparing value, a second comparing value, ---- and an N-th comparing value) are set in advance in the comparing value holding registers $15_1$, $15_2$, ---- and $15_N$. In this case, it is allowed that the comparing values are different from each other.

When a DMA transfer request signal DRQ2 generated in a module corresponding to the second channel is held in the transfer request holding circuit $20_2$, a count operation is started in the transfer waiting time counter $14_2$, and a second count signal indicating a count value (or a transfer waiting time period of the DMA transfer request signal DRQ2 in the transfer request holding circuit $20_2$) is fed to the comparing unit $16_2$. In the comparing unit $16_2$, in cases where the count value of the second count signal agrees with the second comparing value of the comparing value holding register $15_2$, a second comparison result agreement signal is fed to the interruption register 61. When the second comparison result agreement signal is received in the interruption register 61, a bit corresponding to the second channel is, for example, set to "1". Therefore, a second interruption signal is fed from the interruption register 61 to the interruption controller. When the second interruption signal is received in the interruption controller, the interruption controller informs a central processing unit (not shown) of an interruption corresponding to the second channel, and the interruption of the DMA transfer request signal DRQ2 is received in the central processing unit. Thereafter, the DMA transfer is assigned to the DMA transfer request signal DRQ2 under the control of the central processing unit, and the DMA transfer for the DMA transfer request signal DRQ2 is performed. Here, it is applicable that the interruption of the DMA transfer request signal DRQ2 be received in the interruption controller and the DMA transfer is assigned to the DMA transfer request signal DRQ2 under the control of the interruption controller.

As is described above, in the sixth embodiment, when a count value indicating a transfer waiting time period of a DMA transfer request signal in a transfer request holding circuit reaches a prescribed comparing value, an interruption is generated, and the DMA transfer for the DMA transfer request signal is assigned. Accordingly, there is no probability that no DMA transfer for the DMA transfer request having a lower priority set in advance is performed. That is to say, there is no probability that no DMA transfer for the DMA transfer request having a lower priority set in advance is performed for a long time, and the DMA transfer control circuit 51 can prevent the occurrence of a system error.

In this specification, the first to sixth embodiments are described, and it is applicable that a DMA transfer control circuit be structured according to an arbitrary combination among the first to sixth embodiments.

What is claimed is:

1. A direct memory access transfer control circuit, comprising:
    transfer control means for receiving N (N is an integer equal to or higher than 2) DMA transfer requests composed of the first to N-th DMA transfer requests, assigning a plurality of DMA transfers to the N DMA transfer requests, respectively, according to priorities set in advance for the N DMA transfer requests and controlling the DMA transfers; and
    measuring means for measuring a time period from reception of each DMA transfer request by the transfer control means to assignment of the DMA transfer to the DMA transfer request by the transfer control means and outputting the time periods as a plurality of transfer waiting time periods of the N DMA transfer requests.

2. The direct memory access transfer control circuit according to claim 1, wherein the transfer waiting time period of each DMA transfer request is measured by the measuring means each time the DMA transfer request is received, and the transfer waiting time period longest among the time periods of each DMA transfer request is held by the measuring means as a maximum transfer waiting time period for each DMA transfer request.

3. The direct memory access transfer control circuit according to claim 1, wherein the transfer control means comprises a plurality of transfer request holding circuits for receiving the N DMA transfer requests, respectively, holding the N DMA transfer requests, respectively, and the measuring means comprises a plurality of counters for measuring a plurality of time periods from holding of the DMA transfer requests in the transfer request holding circuits to assignment of the DMA transfers to the DMA transfer requests in a count operation as the transfer waiting time periods of the N DMA transfer requests.

4. The direct memory access transfer control circuit according to claim 1, further comprising:
    a storing circuit for storing the transfer waiting time periods of the N DMA transfer requests; and
    reading means for selecting one of the transfer waiting time periods and reading out the transfer waiting time period selected.

5. The direct memory access transfer control circuit according to claim 3, further comprising count control means for selecting one of the counters and feeding a count enabling signal to the selected counter so as to set the selected counter in a count enabling condition.

6. The direct memory access transfer control circuit according to claim 3, further comprising:
    count control means for feeding a plurality of count enabling signals to all the counters, respectively, in response to an event signal input from outside to set the counters in a count enabling condition.

7. A direct memory access transfer control circuit according to claim 1, wherein the transfer control means comprises assigning means for assigning the DMA transfers to the N DMA transfer requests, respectively, according to the priorities set in advance for the N DMA transfer requests, receiving an emergency transfer request signal from a transfer request factor from which the n-th (n is an integer ranging from 1 to N) DMA transfer request included among the N DMA transfer requests is sent out, and assigning the DMA transfer to the n-th DMA transfer request.

8. The direct memory access transfer control circuit according to claim 7, wherein the emergency transfer request signal is received by the assigning means when a prescribed time period passes after reception of the n-th DMA transfer request.

9. The direct memory access transfer control circuit according to claim 1, further comprising:
    comparing means for comparing the transfer waiting time periods output by the measuring means with a plurality of comparing values set in advance, respectively, and outputting a comparison result agreement signal when the n-th (n is an integral number ranging from 1 to N) transfer waiting time period included in the transfer waiting time periods agrees with the corresponding comparing value; and
    interrupting means for interruption of the n-th DMA transfer request included in the N DMA transfer requests in response to the comparison result agreement signal.

10. A direct memory access transfer control circuit, in which N (N denotes an integer equal to or higher than 2) DMA transfer requests, composed of first to N-th DMA transfer requests, are received, a plurality of DMA transfers are assigned to the N DMA transfer requests respectively according to priorities set in advance for the N DMA transfer requests and the DMA transfers are controlled, comprising:
    counting means for counting the number of DMA transfers for each DMA transfer request and obtaining a plurality of count values corresponding to the N DMA transfer requests;
    comparing means for comparing the count values obtained by the counting means with a plurality of comparing values set in advance, respectively, and outputting a comparison result agreement signal when the n-th (n is an integer ranging from 1 to N) count value corresponding to the n-th DMA transfer request agrees with the corresponding comparing value; and
    priority changing means for changing the priorities set in advance for the N DMA transfer requests in response to the comparison result agreement signal output by the comparing means.

11. The direct memory access transfer control circuit according to claim 10, wherein the lowest priority is set for the n-th DMA transfer request corresponding to the n-th count value by the priority changing means in response to the comparison result agreement signal corresponding to the n-th count value.

12. The direct memory access transfer control circuit according to claim 10, wherein the comparing values set in advance by the comparing means are determined according to the priorities set in advance for the N DMA transfer requests.

13. The direct memory access transfer control circuit according to claim 10, wherein the count value obtained by the counting means and corresponding to the n-th DMA transfer request is initialized by the priority changing means in response to the comparison result agreement signal.

* * * * *